United States Patent [19]

Carlson

[11] Patent Number: 5,126,056
[45] Date of Patent: Jun. 30, 1992

[54] CONTINUOUS MOVING BED ION EXCHANGE SYSTEM

[75] Inventor: Lee G. Carlson, Willow Springs, Ill.

[73] Assignee: LCR Inc., Willow Springs, Ill.

[21] Appl. No.: 791,577

[22] Filed: Nov. 12, 1991

[51] Int. Cl.⁵ ............................................. B01D 15/02
[52] U.S. Cl. .................................. 210/676; 210/189; 210/268; 210/269
[58] Field of Search ............... 210/676, 678, 189, 268, 210/269

[56] References Cited

U.S. PATENT DOCUMENTS

| | | | |
|---|---|---|---|
| 3,298,950 | 1/1967 | Mindler | 210/189 |
| 3,492,092 | 1/1970 | Higgins | 210/676 |
| 3,775,310 | 11/1973 | Conway et al. | 210/189 |
| 4,228,001 | 10/1980 | Carlson | 210/189 |
| 4,280,904 | 7/1981 | Carlson | 210/676 |
| 4,670,154 | 6/1987 | Carlson et al. | 210/269 |
| 4,693,818 | 9/1987 | Terrien et al. | 210/189 |

*Primary Examiner*—Ivars Cintins
*Attorney, Agent, or Firm*—Lockwood, Alex, Fitzgibbon & Cummings

[57] ABSTRACT

Sorbable ions are removed from aqueous compositions by the use of an apparatus and method which permits the aqueous composition to flow in an uninterrupted or continuous manner. Included is a resin cycling contactor assembly which continuously accepts the flow of aqueous composition and which turbulently contacts it in a generally co-current elongated contactor path during which ions are removed from the aqueous composition and sorbed to the resin. The resin cycles within the resin cycling contactor assembly until a selected degree of resin contamination is achieved, at which time a predetermined portion of the resin is removed from the resin cycling contactor assembly and replaced by regenerated resin. The resin is regenerated within a regenerator assembly which accomplishes regeneration by counter-current flow of liquids through a packed resin bed.

20 Claims, 2 Drawing Sheets

FIG. 1

CONTINUOUS MOVING BED ION EXCHANGE SYSTEM

DESCRIPTION

1. Background and Summary of the Invention

The present invention generally relates to a moving bed ion exchange apparatus and method for removing ions from water systems. More particularly, the invention is one in which the system accommodates feed of liquid thereinto on a continuous basis to the extent that the feed need not be stopped or otherwise interrupted in order to accommodate processing functions of the apparatus or method. The system is especially useful in treating continuous flows of liquids, such as ion-containing effluents from production facilities. The system is characterized by having a very short resin recycle time and by quickly removing ionic impurities from the continuous flow. During treatment of the feed liquid effluent or the like, the feed liquid and the ion exchange resin proceed in a co-current flow through an elongated and relatively narrow pathway of a resin cycling contactor system which also includes separate vessels wherein resin is recycled in a generally alternating manner to promote the continuous treatment. The resin cycling contactor system interferes with a resin regeneration assembly wherein regeneration proceeds in a generally counter-current fashion in a manner to assist in maintaining the continuous treatment.

Ion exchange resin systems have long been known for removing certain impurities from liquids. The ultimate objective might be in order to purify a liquid product, to remove contaminants from an effluent, a waste stream, or the like, or in order to treat a liquid to render it useful for a particular purpose, such as desalination of sea water for purposes of providing water for human consumption. Systems of these types incorporate ion exchange resins, typically in the form of small beads of resin which sorb materials from the liquid whereby the materials become attached to the site in the matrix of the resin beads and are thus removed from the liquid. The resin beads eventually become full of the material, at which time they can be characterized as spent resin beads. Thereafter, the liquid and spent resin beads are separated from each other. The spent resin beads are then treated with an appropriate chemical in order to regenerate them by removing the material therefrom. Ion exchange removal procedures can be carried out on a batch basis during which liquid treatment and resin bead regeneration are carried out separately, typically in the same vessel and at different times. While batch procedures can be effective in removing contaminants or other materials and in regenerating the resin beads, the flow of liquid to be treated must be stopped periodically in order to permit regeneration of the resin beads.

Various approaches have been taken in order to attempt to achieve a continuous ion exchange removal system. Typically these attempts to provide continuous systems include the utilization of a so-called moving bed of ion exchange resin beads. The objective is to have the beads move in such a manner that they are regenerated in one location and are then moved to a different location at which the regenerated resin beads contact the liquid to be treated. Exemplary moving bed ion exchange systems include those described in Higgins U.S. Pat. No. 3,492,092, Conway U.S. Pat. No. 3,775,310, Carlson U.S. Pat. No. 4,228,001, Carlson U.S. Pat. No. 4,280,904, Carlson et al U.S. Pat. No. 4,670,154 and Terrian and Carlson U.S. Pat. No. 4,693,818. Previously proposed moving bed ion exchange systems such as these generally fall short of a truly continuous ion exchange system. Many moving bed systems require interruption of the feed liquid which is subjected to ion exchange processing. In a truly continuous ion exchange system, the feed into the system need not be interrupted at all.

Previously proposed systems require several hours for resin to cycle completely through a treatment mode, a resin stripping or regeneration mode and a resin rinsing mode. Such approaches require a large inventory of resin, a significant capital investment in equipment for containing and moving the volume of resin needed for such systems and the expense of the building space or floor space needed to accommodate the equipment. Operational efficiencies could be realized by a system such as the present one wherein a relatively low volume of resin is quickly moved through a resin cycle which is on the order of ten minutes in length.

By proceeding in accordance with the present invention, it has been determined that it is possible to efficiently and rapidly treat liquids or waters having a high ionic content and to remove and significantly reduce the amount of adsorbable, absorbable or sorbable substances or ions to a substantially low level. If desired, the thus processed liquid or water can then be fed through a smaller capacity or "polish" fixed bed or moving bed system which is able to handle the substantially reduced ion volumes remaining after processing through the truly continuous moving bed ion exchange system of the present invention.

In summary, the present invention incorporates a system wherein ion exchange resin beads and flows of liquids to be treated and fluids for treating the ion exchange resin material cooperate and interact with each other in order to quickly and efficiently remove from the liquid or aqueous composition being treated those materials which are sorbable onto the ion exchange resin. During the stage within which the aqueous composition is treated, the feed aqueous composition and the ion exchange form a slurry which proceeds in a co-current flow through an exceptionally elongated and relatively narrow contact pathway. Simultaneously, quantities of spent ion exchange resin are subjected to regeneration in a separate assembly. Additional separate vessels and conduits serve to provide resin cycling and interface means between the elongated co-current treatment pathway and the regeneration assembly. Regeneration takes place in a generally counter-current manner, and liquid flows are routed so as to provide rinsing or washing functions, thereby enhancing the overall efficiency of the system. The elongated co-current treatment pathway includes a treatment vessel or contactor which has a low diameter-to-length ratio whereby the slurry moves rapidly while minimizing any dead space in the contacting zones. This provides for rapid and efficient contacting between the resin and the liquid having the sorbable material which is removed from the liquid upon contacting the resin.

It is accordingly a general object of the present invention to provide a system for continuously and rapidly removing sorbable substances from aqueous streams.

Another object of this invention is to provide an improved apparatus and method wherein an aqueous feed composition or solution flows constantly into an ion exchange system, is treated thereby, and exits from the system after having been stripped of relatively large volumes of sorbable materials.

Another object of the present invention is to provide an improved apparatus and method whereby ionic materials are removed from an aqueous flow moving in a co-current direction with regenerated resin in a manner which facilitates removal of the ions by the resin.

Another object of this invention is to provide an improved apparatus and method including the provision of a resin cycling contactor system which cycles the resin in a manner that accommodates a continuous feed.

Another object of the present invention is to provide an improved apparatus and method for treating aqueous flows having relatively large volumes of sorbable materials by removing a substantial quantity of those materials and processing the aqueous flow therethrough within a matter of minutes.

Another object of this invention is to provide an improved apparatus and method for a continuous ion exchange treatment of waters having relatively high ion contents while minimizing the footprint area required for the equipment.

These and other objects, features and advantages of the present invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

The preferred embodiment illustrated in the drawings includes resin cycle contactor assembly including a treatment vessel or contactor 11. Interface vessels are in resin-passing communication with the contactor 11 in order to supply fresh resin and/or receive spent resin from the contactor 11. In the illustrated embodiment, three interface vessels are provided. Two of them can be considered as intermediate vessels which are recycle resin reservoirs 12 and 13, and the third can be considered a spent resin reservoir 14. Spent resin is transferred to a top portion of a regeneration vessel of a regenerator assembly 15, which strips the sorbed ions from the ion exchange resin and provides fresh regenerated and rinsed resin for eventual movement into the contactor 11. Aqueous compositions containing relatively high quantities of sorbable materials or ions enter the resin cycle contactor assembly through feed line 16. After the aqueous composition is treated in accordance with the invention in order to remove a large percentage of the sorbable materials, the thus treated aqueous product passes out of the system through a product line 17. The aqueous composition moves from the feed line 16 to the product line 17 within a matter of minutes, while the resin circulates throughout the resin receiving vessels and conduits illustrated in FIG. 1 at a rapid rate.

Figure 1:
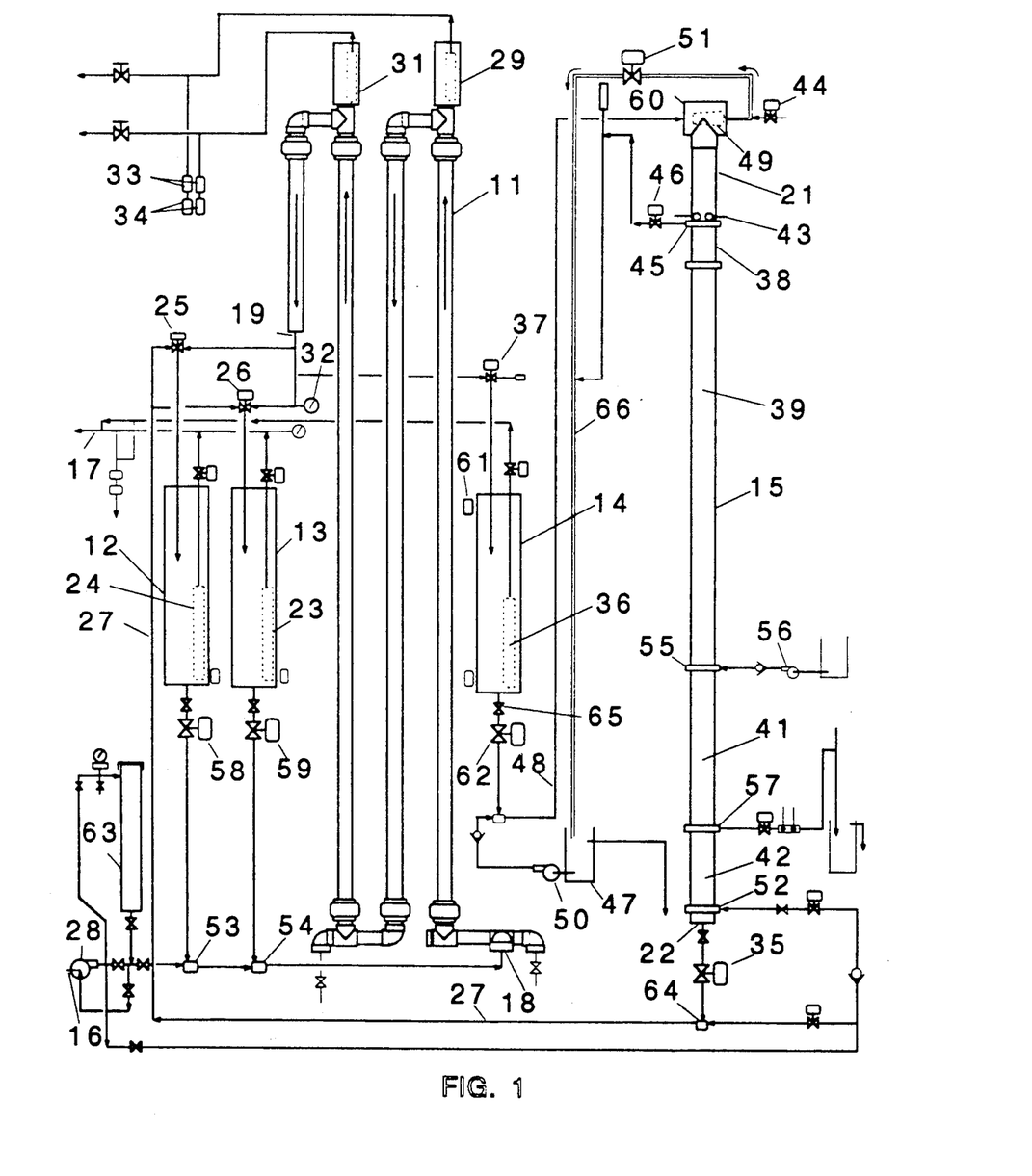
FIG. 1 is an elevation view, with some details illustrated in schematic fashion, of a preferred system in accordance with the present invention wherein resin and liquid flow pathways as well as treatment pathways are illustrated.

As part of the resin cycling arrangement, unspent resin in intermediate vessel 12 is dispensed therefrom and into an inlet or bottom end 18 of the contactor 11, accompanied by aqueous composition from the feed line 16, whereby a slurry of unspent resin and aqueous composition feed is moved into and through the contactor 11. During a rapid and generally turbulent flow of the slurry through the contactor 11, the sorbable materials within the aqueous composition are contacted with and removed by the resin as the resin and aqueous composition move in a co-current manner.

Cycled resin and a clarified aqueous composition or product liquid exit the contactor 11 through an outlet 19. In the illustrated embodiment, the intermediate vessel 13 receives the bulk of this resin and liquid and separates the aqueous product liquid from the cycled resin, with the aqueous product passing through product line 17. Because a slurry of generally uniform consistency passes through the contactor 11, the volume of aqueous feed and unspent resin slurry which enters through inlet 18 is substantially the same as the volume of clarified aqueous product and cycled resin which exits through outlet 19 of the contactor 11. As will be explained in greater detail herein, this slurry inflow is, when needed, continuous in order to accommodate a continuous flow of aqueous feed into the feed line 16, such as from a waste water flow out of a processing facility. In a further stage of the resin cycling arrangement, the intermediate vessel 13 provides the resin to make up the feed slurry entering the inlet 18, and the intermediate vessel 12 receives the flow of clarified aqueous composition and cycled resin passing through outlet 19.

Intermediate vessels 12 and 13 separate the cycled resin from the just clarified aqueous composition which then exits the system through product line 17. Typically, for feeds having materials to be ionically removed in the 1,000 ppm, or higher range after two cycles through the contactor 11, the twice cycled resin is reduced in its ion-holding capacity to such a degree it is most efficient to pass a portion of the resin to the regeneration assembly, preferably after first passing same into intermediate vessel or spent resin vessel 14. For purposes of discussion, this portion of resin transferred is referred to herein as spent resin. Also, it will be appreciated that cycling of resin within the resin cycling contactor assembly can proceed through less than or greater than two cycles, depending upon feed and resin conditions.

Flow of spent resin from the intermediate vessel 14 and to the regenerator 15 proceeds through transfer conduit 48. It will be noted that this flow takes place while intermediate vessels 12 and 13 continue to cooperate with contactor 11 as described herein in order to maintain the continuous flow of resin and aqueous composition slurry into, through and out of the contactor 11. By a procedure discussed in greater detail hereinafter, the spent resin transferred to the regenerator 15 is brought into contact with regeneration chemicals and rinse chemicals in a generally counter-current manner. Spent resin enters a spent resin metering section 21 and moves generally downwardly in metered stages through the regenerator 15. After regeneration and rinsing have been completed, a metered amount of thus regenerated resin passes through resin outlet 22 for entry or reentry into the resin cycling contactor assembly.

It will thus be seen that, in accordance with the present invention, it is possible to treat a constant flow of aqueous composition or feed liquid passing through the feed line 16. Also, regeneration proceeds as an operation that is independent from the processing operation. There is no need to stop flow through the feed line 16 in order to allow resin shifting. Additionally, the ratio of resin in the regeneration mode to the resin in the processing mode is relatively low, and the resin is re-used in a matter of minutes, rather than in a matter of hours.

Resin Cycling Contactor System

Recycle resin reservoirs 12 and 13, together with the contactor 11, combine to provide a resin cycling contactor system or assembly of the truly continuous moving bed ion exchange system. In general, resin within the intermediate vessel 12 is transferred therefrom and combined with raw aqueous composition or raw feed liquid flowing through the feed line 16. The resin and feed water form a slurry which enters and flows through the contactor 11 in a flow pathway that has an extremely low diameter-to-length ratio, and it serves to provide a relatively long length of time (as a percentage of the overall flow path of the system) for the resin and feed water to be in ion exchange contact with each other. During this time, sorbable materials or ions within the feed water are removed therefrom by the operation of the ion exchange resin in a manner well appreciated in the art. At this stage of the illustrated treatment or processing, the slurry flows to another intermediate vessel. In the case of the illustrated preferred embodiment, this flow is into the recycle resin reservoir 13.

Vessel 13 receives and/or collects the cycled resin, which preferably is not fully spent because the sorbable material which it gained from the feed water has not fully exhausted the ability of the resin to accept additional sorbable materials or ions. Nevertheless, the feed water has been acceptably treated, and the thus clarified aqueous composition or feed water passes through a suitable outlet to separate same from the cycled resin. The illustrated outlet is a screened passageway such as the illustrated screened cylinder 23 having a liquid-passing and resin-stopping passageway opening into at least a bottom portion of the vessel 13. This passageway is in communication by suitable illustrated conduits and valving with the product line 17. Recycle resin reservoir 13 will eventually become substantially full of resin, at which time suitable sensors and valving are activated so that reservoir 13 then becomes the supplier of resin to the feed line 16, while the reservoir 12 becomes the vessel for collecting the slurry which has been passed through the contactor 11. At this stage, the thus clarified aqueous composition or feed water product passes through its screened cylinder 24 and into the product line 17.

At initial startup of the resin cycling contactor assembly, recycle resin reservoir 12 is substantially full of fresh or substantially fully regenerated resin, while recycle resin reservoir 13 is substantially empty of resin. Preferably, contactor 11 is approximately one-quarter full of resin, and each of the vessels of the resin cycling contactor assembly is substantially full of aqueous composition or water. Reservoir 12 is substantially full of resin because same had been transferred from the regenerator assembly 15. When reservoir 12 later becomes the collector and reservoir 13 becomes the supplier of resin, then reservoir 12 obtains its resin from the contactor 11. As generally mentioned heretofore, the resin from the contactor 11 will have lost some of its capacity to sorb ions because of having exchanged its ions with those from the feed water or aqueous composition. In this way, reservoir 12 acts as a dispensing vessel while reservoir 13 concurrently functions as a resin receiver. The same co-current slurry flow and contact functions are achieved, but with the roles of the two reservoirs 12 and 13 being reversed when reservoir 13 functions as the resin supplier and reservoir 12 functions as the resin collector.

Each of the resin reservoirs 12, 13 is in resin passing communication with a three-way resin valve 25, 26. Each three-way resin valve permits its recycle resin reservoir 12, 13 to receive regenerated resin from the resin regenerating assembly. The resin passes through conduit 27, thereby allowing reservoir 12, 13 to accept regenerated resin. Each three-way resin valve 25, 26 also allows, at the appropriate time, the reservoir 12, 13 to receive the slurry being cycled and which is passed through the outlet 19 of the contactor 11. Finally, the three-way resin valve 25, 26 functions to close off the resin pathway.

Contactor 11 serves as the major ion exchanger vessel, and it has no moving parts. Due at least in part to the low diameter-to-length ratio, the resin and feed water slurry therewithin is vectored for short distances of motion, which minimizes and all but eliminates any dead space of the contacting zones within the contactor 11. This generally turbulent movement of the slurry through the contactor 11 facilitates ion transfer. The primary purpose of contactor 11 is to establish a relatively long and active residence time and thus enable the exchange of ions to proceed to equilibrium for that particular ratio of feed rate, feed concentration and resin volume. Generally speaking, the sizing of the contactor 11 can be tailored depending upon the flow of feed water into the system, the strength of the ionic content thereof, and the extent of ion removal which is desired. When desired, one or more sections of the contactor 11 can include bleed off ports 29, 31 for removing the liquid being treated for analysis or for blending with product water downstream in a pipe or holding tank, as desired. Sensors 32, 33, 34 serve as monitors of water conditions which can be used to signal for changes in resin or slurry flow paths as discussed herein.

With more particular reference to the three-way valves 25, 26, liquid pressure developed within the conduit 27 assists in pushing the resin down and out of the recycle resin reservoir 12. Resin is transferred from the regenerator 15 when its exit valve 35 and the valve 44 are opened, in which case resin is passed through conduit 27 and valve 25 and into reservoir 12. A similar pressurization and a similar transfer movement arrangement is carried out by operation of the three-way resin valve 26 to transfer resin from the regenerator 15 to the recycle resin reservoir 13.

Resin Regenerating System

Spent resin is regenerated in the regeneration assembly including regenerator vessel 15. Resin in the hydrogen form is produced by an acid. Other resins and ionic forms can be made by suitable regenerants in accordance with known principles. At initial startup of the system, vessel 15 is full of resin and liquid. Intermediate vessel 14 serves as a spent resin reservoir for the regenerator vessel 15. When a signal is given that it is time to regenerate the resin passing through the resin cycling contactor assembly, the slurry passing through outlet 19 is fed into the spent resin reservoir 14. Separation of resin from the treated feed liquid or aqueous composition is accomplished in a suitable manner such as by operation of the screened cylinder 36. A resin valve 37 provides for selected transfer of a portion of the slurry from contactor 11 into spent resin reservoir 14 when resin cycling has proceeded as desired or when predetermined threshold conditions have been reached in the contactor 11.

At the appropriate time, such as by operation of a sensor or a cycle counter or a timer, the previously cycled resin within the spent resin reservoir 14 will be transferred to the spent resin metering section 21 of the regenerator vessel 15. By operation of suitable valving and pumping, a metered volume of spent resin is transferred from the spent resin reservoir 14 to the regenerator vessel 15.

With reference to FIGS. 2A, 2B, 2C, 2D and 2E, backwashing, chemical regeneration and rinsing are performed in the regenerator vessel 15, with resin movement being countercurrent to the flow direction of these liquids. The regenerator vessel 15 includes a column divided into essentially five functional zones which are generally shown in FIG. 1. The uppermost one is the spent resin metering zone 21 discussed hereinabove. Others are a buffer zone 38, a regeneration zone 39, a rinse displacement zone 41 and a fast rinse zone 42. A total of ten concentration sections are illustrated in FIGS. 2A-2E in order to indicate approximate concentrations in the section(s) of each respective zone after operation of the particular step detailed in each of FIG. 2A through FIG. 2E. The regeneration zone 39 comprises approximately 60% of the total column length.

Figure 2:
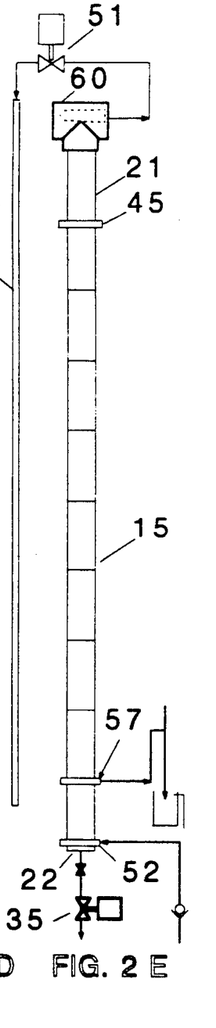
FIGS. 2A, 2B, 2C, 2D and 2E are generally schematic illustrations of various stages of treatment within the regeneration assembly to strip ions from the resin on a counter-current basis.

Before resin is transferred from spent resin reservoir 14 to regenerator vessel 15, resin had been removed from the regenerator vessel 15 until the spent resin metering zone 21 had been substantially totally emptied, as seen in FIG. 2A. In the preferred arrangement, the exit valve 35 opens as generally discussed herein, and the resin level drops until a sensor 43 (FIG. 1) is activated, thereby generally defining the spent resin metering zone 21 at approximately 10% of the vessel volume. A small volume of compressed air can be used in order to provide a fast response for moving the resin bed downwardly as a unit mass by a suitable air injection system 44. Buffer zone 38 has a volume of approximately 2 to 5% of the volume of the resin column and makes up only a portion of section 2 of regenerator vessel 15. Buffer zone 38 can be considered to be a loss of transfer stage height section.

FIG. 2B shows transfer of the spent resin into the emptied spent resin metering zone 21 from reservoir 14. Transfer is preferably achieved by using a transport media which is the waste liquor discharged from the lower part of the spent resin metering zone 21 through a screen 45 and valve 46 for passage to collector tank 47. This waste liquor is primarily remaining regenerant liquid that is not used within the regenerator vessel 15. This recycle waste within the collector tank 47—or product water from product line 17—then is moved, together with spent resin from the reservoir 14, through the transfer conduit 48 and into the spent resin metering zone 21 by operation of pump 50. During this passage, there is initially a turbulence in spent resin metering zone 21, and the resin beads begin to collect around a screen 49 in housing 60 which retains the resin beads and allows the liquor to pass therethrough. When the flow of resin and liquor ceases, the resin beads fall off the screen 49 and into the column. The volume of resin transferred into and out of the column during each of the transfer step is illustrated in FIG. 2A and FIG. 2B is approximately one-tenth of the volume of the regenerator vessel or column 15.

The first step in the preferred regeneration sequence is a displacement rinse step shown in FIG. 2C. Rinsing liquid is pushed u through substantially the entire column 15, entering at screen 52 and venting through a valve 51. This liquid mass is contained within the void volume of the resin beads, which is approximately 40% of the volume of the resin bulk volume. The entire liquid mass moves up as a plug until a sensor such as sensor 43 emits a suitable signal. The liquid which is pumped through screen 52 can be rinse water for recycle or other dilution water.

Regenerant chemicals are added preferably through a screen 55 by activation of a pump 56 (FIG. 1). The flow is upwardly and counter-current to the direction of resin flow. This flow is discharged as waste liquor through the screen 45 and valve 46 to be collected in the tank 47 as shown in FIG. 2D. The flow into tank 47 can be used in transferring the resin slurry from reservoir 14 to regenerator 15 as previously discussed. Regeneration takes place within regeneration section 39, where counterflowing regenerant solution exchanges ions with the spent resin to return the resin to its regenerated state in accordance with generally known principles. In essence, ions sorbed into the resin matrix are removed.

A fast rinse operation is illustrated in FIG. 2E. This occurs prior to removal of regenerated resin from the bottom of the regenerator vessel 15. Product water is delivered through screen 52 and out of screen 57 for eventual recovery in a tank or the like for possible use in the rinsing operation as generally discussed herein.

Operation of the Illustrated Embodiment

Contaminated feed water or the like which continuously flows through feed line 16 serves to educt resin from either recycled resin reservoir 12 or 13, depending upon whether valve 58 or 59 is opened, which resin movement may be assisted by positive pressure applied through valve 25 or 26. Eductors 53, 54 preferably combine the resin and liquid by use of a venturi effect to enhance rapid movement and turbulence of the formed slurry. The thus formed slurry flows through inlet end 18 of the contactor 11, which preferably includes a plurality of generally vertical sections joined in the generally continuous top and bottom manner as illustrated in the drawings. The resin which was originally joined in the sections will expand because the flowing water forms a resin slurry. The resin slurry is in rapid motion, and as the water turbulates, ions within the water contact around the surface of the resin spheres causing the ions in solution to exchange with those in the resin beads. The slurry exits through outlet 19 and passes into either of the recycle resin reservoirs 12 or 13, with the resin remaining therein and the thus treated aqueous composition or feed water passing through screen arrangement 23 or 24 and into the product line 17. When appropriate sensors signal that reservoir 12 is substantially empty and reservoir 13 is substantially full, valve 58 is closed and valve 59 is opened. At about the same time, valves 25 and 26 are manipulated so that the resin slurry from the outlet 19 will pass into reservoir 12 but not into reservoir 13.

When suitable devices such as sensors 32, 33, 34 indicate that a fresh influx of resin into the resin recycling system is needed, steps are taken whereby spent resin is removed from the resin cycling contactor assembly and dispensed into spent resin reservoir 14 or other suitable vessel. A generally corresponding amount of fresh resin is inputted into the resin cycling contactor assembly. In this regard, air injection system 44 is opened admitting air at between about 5 and 25 psi for several seconds. Then exit valve 35 is opened for 10 to 30 seconds, during which one unit volume of resin is transferred from the regenerator vessel 15 to one of the recycle resin reservoirs 12 or 13. One unit volume of resin is approximately one-tenth of the total volume of the contactor 11.

With more particular reference to the sensors 32, 33, 34, they can include a pH electrode, an electrode for specific ions, such as sodium ions, and a pressure sensor and the like. These electrodes determine the quality of the water within the resin cycling contactor assembly. When particular values of the quality of the water are detected by the sensors 32, 33, 34, or by operation of other means, this signals the transfer of resin out of and into the resin cycling contactor assembly. Preferably, a new addition of regenerated resin replaces an equal volume of spent resin which is thus removed from the resin cycling contactor assembly.

Regarding transfer of the spent resin from the contactor 11 to the spent resin reservoir 14, valve 37 is opened to permit some resin slurry to flow into the spent resin reservoir 14. This flow of spent resin into reservoir 14 will be facilitated and will proceed more quickly when three-way resin valve 25, 26 (whichever one was open for resin flow into reservoir 12, 13) is closed. This transfer of resin into the spent resin reservoir 14, in the preferred embodiment, is initiated by signals received from one or more of the sensors 32, 33, 34. A suitable detector such as optical sensor 61 which detects resin level through the transparent walls of the spent resin reservoir 14, will signal that the spent resin reservoir 14 is substantially full. When this occurs, resin valve 37 is closed. Preferably, transfer valve 62 was in its open mode at the time the spent resin slurry was flowing into the spent resin reservoir 14. Preferably, the spent resin slurry was thus flowing through the transfer conduit 48 and filling the spent resin metering zone 21 as described herein. When this preferred feature is practiced, the transfer valve 62 likewise preferably will be closed at about the time resin valve 37 is closed. Of course, valve 25, 26 is opened at about this same time so that the resin slurry passing through outlet 19 of the contactor 11 will flow into recycle resin reservoir 12, 13. Typically, the valve 25, 26 which is opened at this stage is the valve which had been closed at the time resin valve 37 had been opened to move the flow of resin into the spent resin reservoir 14. At this stage, both the spent resin reservoir 14 and the regenerator 15 are full.

With spent resin having been removed from the resin cycling contactor assembly, steps are taken to transfer regenerated resin from the regenerator 15 into the resin cycling contactor assembly. Typically, this transfer will be from the resin outlet 22 of the regenerator 15 and into recycle resin reservoir 12. Preferably this is accomplished by an eduction procedure as follows. With exit valve 35 opened, booster pump 28 is energized whereby product water flows from a suitable source, such as the illustrated reservoir 63 containing product that had exited from product line 17 or other suitable liquid. Another suitable source of liquid having a relatively low ion content, such as tap water or the like, could be used as the eduction liquid which is pumped into an eductor or T-fitting 64. At this point, a slurry is formed of regenerated resin and aqueous composition or water. This regenerated resin slurry flows through three-way resin valve 25 (or 26 if appropriate) and into recycle resin reservoir 12 (or 13). Typically, at least some of the water from the slurry will pass out of the reservoir 12 (or 13) through the screened cylinder 24 (or 23) and into the product line 17. It is an important aspect of the invention that, at the time this transfer of regenerated resin into the resin cycling contactor system is proceeding, the aqueous composition to be clarified can continue to flow through feed line 16, and the resin slurry continues to flow through outlet 19 of contactor 11 into either the recycle resin reservoir 13 or the spent resin reservoir 14.

Once the regenerated resin portion is removed from the regenerator 15 for transfer to the resin cycling contactor system, exit valve 35 is closed, and the remaining resin within the regenerator assembly drops by gravitational forces, as a result of which the top portion of the regenerator column is emptied. The spent resin metering zone 21 generally corresponds in volume to the volume emptied from the regenerator 15. This allows for spent resin to be transferred from the spent resin reservoir 14 to the spent resin metering Zone 21. Typically, this is accomplished via resin eduction by opening valve 62 which allows resin to drop into transfer conduit 48. Preferably, the amount of resin thus passing is monitored by suitable means such as a metering valve 65. Movement of the resin through the transfer valve 62 and metering valve 65 is facilitated by aqueous flow through screened cylinder 36 and product line 17. As is generally discussed elsewhere herein, the resin dropping through transfer valve 62 forms a slurry with recycled waste liquid within the collector tank 47 by operation of a suitable pump 50. The slurry thus formed is thereby educted through the transfer conduit and into housing 60 which adjoins the spent resin metering zone 21. The recycle aqueous waste which educts the spent resin through the transfer conduit 48 exits housing 60 through its screen 49 and open valve 51 for entry into downcomer pipe 66 to return the recycle aqueous waste to the collector tank 47. Some of this recycle aqueous waste will also pass through screen 45, thereby assisting the spent resin to fall from the screen 49 in order to fill the spent resin metering section 21. This recycle aqueous waste also flows into the downcomer 66 for return to the collector tank 47. At this stage of the spent resin transfer, all of the valves of the regenerator assembly are closed.

Regeneration and rinsing then proceed as discussed. Regenerant solution counterflows from screen 55 through the resin and out of the regenerator 15, typically at screen 45. Primary regeneration in this regard takes place within regeneration zone 39, which comprises approximately 60% of the volume of the resin column. The resin is regenerated to close to its full capacity by the use of strong regenerant solutions, which drives the resin capacity to greater than 90%. During rinsing, incoming product water enters the bottom of the column and injects liquid into the rinse displacement zone 41 in a volume generally the same as 40% of the resin volume transferred out of the column. In effect, this moves the liquid mass upwardly within the column. The rinse-regenerant interface will be in the vicinity of the incoming regenerant screen 55. The liquid mass is in its original position before the metered volume of resin was removed from the column. The function of the displacement rinse is to push the liquid mass as a common plug upward to the position where the incoming regenerant interface was prior to the removing of a metered volume of regenerated resin from the regeneration column to the resin cycling contactor assembly. The liquid mass unit's excess uppermost volume will exit the regeneration column through screen 45 for eventual passage into collector tank 47. The volume is metered into the column by a positive displacement pump. After displacement rinsing, the upper portion of displacement zone 41 will have a regenerant concentration in the resin's void volume which is significantly greater than the concentration in the lower portion of zone 41. For example, upper portion could be at least about 0.2N (730 ppm as hydrochloric acid) while the lower portion could be about 0.02N.

Fast rinse zone 42 comprises approximately 10% of the resin volume. The upward flow of product water therethrough removes any remaining regenerant solution from the interstitial volume between the resin beads, while also releasing solution from the resin beads themselves as the resin adjusts to its water content. Preferably the fast rinse liquid is either product water or deionized water. The fast rinse is essentially a flushing step which starts promptly after the displacement rinse.

Ion Exchange Within the Resin Cycling Contactor System

Feed water entering the resin cycling contactor assembly through the feed line 16 encounters the resin flow from recycle resin reservoir 12, 13. This encounter forms a slurry which is in turbulence, thereby causing multitudinous contact of resin beads and water. As flow of this slurry continues, the water has a diminishing concentration of ionic values. Initially, the kinetics of the ion exchange procedure provide a very high exchange rate, which exchange rate decreases to a slower value at downstream locations within the resin cycling contactor system. This arrangement effects a quick removal of ions from the feed water, which allows for effective ion exchange removal to take place with a relatively small resin bead inventory. In effect, the mobility of the ions will be such that they will not penetrate deeply into the resin bead matrix, but they remain close to the surface. This facilitates and speeds u regeneration of the resin back to full ion exchange capacity. Thus, the useful capacity of the resin in this system may not be its full capacity.

Ideally, ion exchange equilibrium will be reached in the last section of the contactor 11. Equilibrium is that situation at which no more ion exchange will take place. The primary purpose of the system according to the invention is to treat aqueous compositions having relatively high concentrations of sorbable ions and to remove the bulk of those ions quickly and with a minimum amount of resin inventory. The resin is regenerated approximately back to its full capacity, thereby having the equilibrium shifted to its maximum effect.

EXAMPLE 1

A continuous moving bed ion exchange system test unit generally as shown in FIG. 1 had the following parameters. Resin reservoirs 12, 13 and 14 each had a diameter of six inches and a height of 30 inches. Contactor 11 included three full legs, each being 2 inches in diameter and 10 feet in length. At a feed rate of 5 gallons per minute, this system would exhibit a residence time of 50 seconds. For a feed containing 3,500 ppm sodium ions, the unit would remove approximately 3,000 ppm. The resin to water ratio is one part resin per 10 to 13 parts raw feed water. This means that one liter of resin would have to be regenerated each minute for resin operating at a full exchange resin capacity of 2.0 equivalents per liter of cation resin. Assuming the unit of resin transfer into and out of the regenerator 15 is one cubic foot, the regeneration and rinsing parameters would be as follows: 3 gallons of 17% hydrochloric acid regenerant solution (which is an especially strong acid concentration), 3 gallons of displacement rinse and 6 gallons of fast rinse.

EXAMPLE 2

Five different aqueous composition feed waters were prepared and processed through a unit generally in accordance with Example 1. The regenerator had a diameter of 4 inches, and the resin used was the cation resin Dowex Marathon (trademark), which is a 1.9 equivalents per liter cation resin. The designed resin capacity for these runs was 1.7 equivalent per liter (48 equivalents per cubic foot). The unit resin volume was 1.8 cubic feet. Hydrochloric acid was used as the regenerant, the design requiring 4.3 pounds per cubic foot of resin. The ratio of diameter to length of the contactor was 0.033 to 1.

In the first run, 1,215 gallons of feed were processed in six hours at a flow rate of 1.7 gallons per minute and feed flux of 8.5 gallons per minute per square foot. The feed water contained 45 mg/l calcium, 23 mg/l magnesium, 65 mg/l sodium, 31 mg/l copper, 23 mg/l cadmium, 24 mg/l zinc and 2.0 mg/l lead, for a total of 213 mg/l added ions. After processing, the flow out of the product line analyzed as follows: 6.0 mg/l calcium, 2.5 mg/l magnesium, 7.0 mg/l sodium, 6.0 mg/l copper, 4.5 mg/l cadmium, 9.0 mg/l zinc and 0.2 mg/l lead, for a total of 35.2 mg/l. Thus, 177.8 mg/l Were removed, or 83.5% of the added ions. The pH of the product water was 1.53. 0.74 cubic feet was the resin stoichiometry. 35.6 equivalents were removed. During regeneration, 14.5 gallons of backwash, 21.7 gallons of rinses and 1.08 gallons of regenerant (28% hydrochloric acid) were used. The percent of regeneration over the stoichiometry was 10.3%. 1,177.7 gallons of product water were collected, with the waste generated being 3.1%. Upon extrapolating these values for a small full-sized unit which would process 10,000 gallons of feed aqueous composition in twelve hours, the calculated generated waste is 2.3%.

In the second run, 1,445 gallons of feed were processed in six hours at the 1.7 gallons per minute feed flow rate. The made up feed water had the following added thereto: 185 mg/l calcium, 105 mg/l magnesium, 68 mg/l sodium and 0.1 mg/l zinc, for a total of 358.1 mg/l. The product had a total of 47 mg/l, as follows: 25 mg/l calcium, 20 mg/l magnesium, 2 mg/l sodium and 0.04 mg/l zinc. A total of 311.1 mg/l were removed during the run, a percentage removal of 86.9%. The pH of the product water was 1.17. 2.04 cubic feet was the resin stoichiometry. 97.7 equivalents were removed for the run. Regeneration used a total of 102.2 gallons of liquids, namely 39.7 gallons backwash, 59.5 gallons rinses and 2.97 gallons of 28% hydrochloric acid regenerant. The percent regeneration over stoichiometry was 10.3%. 1,342.8 gallons of product water were generated, with the waste being 7.1%. By extrapolation, 6.3% waste would be generated for a small full-sized unit processing 10,000 gallons of feed in twelve hours.

In the third run, 1,525 gallons of feed were processed in six hours at a feed flow rate of 1.7 gallons per minute. The feed water had the following added thereto: 505 mg/l calcium, 105 mg/l magnesium, 68 mg/l sodium, 0.5 mg/l cobalt and 0.5 mg/l zinc, for a total of 679 mg/l. After processing, the analysis was as follows: 45.0 mg/l calcium, 17.5 mg/l magnesium, 6.0 mg/l sodium, 0.05 mg/l cobalt and 0.04 mg/l zinc, for a total of 68.6 mg/l. Removal for the run was 610.4 mg/l, for an ion removal of 89.9%. The pH of the product water was 0.9. 3.96 cubic feet was the resin stoichiometry. 190 equivalents were removed for the run. Regeneration used a total of 198.8 gallons, namely 77.2 gallons backwash, 115.8 gallons rinses and 5.77 gallons regenerant. Regenerant efficiency was 10.3% over stoichiometric. The run generated 1,326.2 gallons of product water, the waste generated being 13.0%. Extrapolation to a small full-sized unit gives a waste generated of 10.3%.

1,750 gallons of feed were processed in six hours for fourth run at a feed flow rate of 1.7 gallons per minute. The feed water had the following added thereto: 800 mg/l calcium, 240 mg/l magnesium, 10 mg/l sodium, 0.9 mg/l copper, 0.5 mg/l cobalt, 0.5 mg/l zinc and 1.0 mg/l lead, for a total of 1,052.9 mg/l. The product was found to have a total of 93.2 mg/l as follows: 65 mg/l calcium, 26 mg/l magnesium, 2 mg/l sodium, 0.05 mg/l copper, 0.05 mg/l cobalt, 0.03 mg/l zinc and 0.04 mg/l lead. The total removed was 959.7 mg/l, with 91.2% of the ions removed. The pH of the product water was 0.68. Resin stoichiometry was 7.56 cubic feet. The equivalents removed were 362.7. Regeneration solutions totalled 379.4 gallons, namely 147.4 gallons backwash, 221.0 gallons rinses and 11.2 gallons 28% hydrochloric acid regenerant. Regenerant efficiency was 10.3% over stoichiometric. 1,370.6 gallons of product were provided, the waste generated being 21.7%. When calculated for a small full-sized unit, the waste generated would be 17.2%.

The fifth run simulated a desalination procedure illustrating the usefulness of the invention in removing calcium and magnesium from sea water. More particularly, the feed aqueous composition included 206 mg/l calcium, 89 mg/l magnesium, 3,480 mg/l sodium, 0.5 mg/l copper, 0.1 mg/l cobalt and 0.8 mg/l lead, for a total of 3,776.4 mg/l. 1,320 gallons of this feed were processed in six hours for a feed flow rate of 1.7 gallons per minute. The product water analyzed as follows: 6.5 mg/l calcium, 4.0 mg/l magnesium, 535.0 mg/l sodium, 0.08 mg/l copper, 0.01 mg/l cobalt and 0.05 mg/l lead. Removed during the run were 3,230.8 mg/l, a percentage of 85.6%. The pH of the product water was 0.26. 15.10 cubic feet was the resin stoichiometry. 724.6 equivalents were removed for the run. Regeneration used 758 gallons comprised of 294.4 gallons backwash, 441.6 gallons rinses and 22.02 gallons 28% hydrochloric acid regenerant. Regenerant efficiency was 10.3% over stoichiometric. The gallons of product water were 562, and the waste generated was 57.4%, which extrapolated to 45.4% for a small full-sized unit.

It will be understood that the embodiments of the present invention which have been described are illustrative of some of the applications of the principles of the present invention. Numerous modifications may be made by those skilled in the art without departing from the true spirit and scope of the invention.

I claim:

1. A continuous moving bed ion exchange apparatus, comprising:
   a resin cycling contactor assembly including means for contacting a feed aqueous composition with ion exchange resin, the feed aqueous composition and the ion exchange resin moving in a generally co-current direction within the resin cycling contactor assembly;
   a regeneration assembly having means for accepting spent resin from the resin cycling contactor assembly, for regenerating the spent resin by removing contaminant ions therefrom, and for transporting regenerated resin to the resin cycling contactor assembly;
   said resin cycling contactor assembly including an elongated contactor having an inlet, an outlet and a lengthy flow path of a relatively narrow cross-section;
   said resin cycling contactor assembly including at least two recycle resin reservoirs positioned in a generally parallel relationship with respect to each other;
   each of said recycle resin reservoirs including means for providing resin to means for combining said resin with a flow of feed aqueous composition into a feed slurry which flows into the inlet of said contactor;
   said resin cycling contactor assembly further including a spent resin reservoir;
   each of said recycle resin reservoirs and said spent resin reservoir including means for receiving a slurry of cycled resin and treated aqueous composition from the outlet of said contactor;
   said recycle resin reservoirs being in alternating communication with said means for transferring regenerated resin from the regeneration assembly and being in alternating communication with said inlet and outlet of the contactor, said alternating communications being such that neither recycle resin reservoir is in communication with both the regenerated resin transfer means and the contactor outlet at the same time during operation of the apparatus; and
   means for transferring out of said apparatus an aqueous composition product which had passed through said resin cycling contactor assembly.

2. The continuous apparatus in accordance with claim 1, wherein each of said recycle resin reservoirs and said spent resin reservoir has a cross-sectional area substantially greater than said relatively narrow cross-section of the contactor.

3. The continuous apparatus in accordance with claim 1, wherein said regeneration assembly regenerates the ion exchange resin by countercurrently contacting the resin with treatment liquids.

4. The continuous apparatus in accordance with claim 1, wherein said means of the recycle resin reservoirs for combining resin and aqueous feed further includes introducer means for combining the aqueous composition feed with resin from the recycle resin reservoirs, said introducer means injecting a flow of aqueous composition feed into a flow of ion exchange resin from one of the recycled resin reservoirs and for thus forming the feed slurry by venturi action, the feed slurry having turbulence characteristics.

5. The continuous apparatus in accordance with claim 4, wherein said introducer means and contactor cooperate such that resin within the contactor has an average velocity which is less than the average velocity of aqueous composition within the contactor.

6. The continuous apparatus in accordance with claim 1, wherein said regenerator assembly includes a generally vertical bed of packed ion exchange resin beads, means for injecting regeneration liquid into the resin column and for passing same in a generally laminar flow, and injection means for providing a laminar flow of displacement rinse solution through the compacted resin bed.

7. The continuous apparatus in accordance with claim 1, wherein said means for passing resin from the regeneration assembly to the resin cycling contactor assembly includes means for metering the amount of resin thus passed.

8. The continuous apparatus in accordance with claim 1, wherein said contactor has a length which is adequate to provide a residence time of the feed aqueous composition within the contactor and in turbulent contact with the resin therewithin, which residence time is adequate to achieve desired removal of ions from the feed aqueous composition.

9. The continuous apparatus in accordance with claim 1, wherein each of said recycle resin reservoirs and spent resin reservoir includes means for separating the slurry of cycled resin and treated aqueous composition into cycled resin and treated aqueous composition flowing to said transferring means.

10. A continuous moving bed ion exchange apparatus, comprising:
a resin cycling contactor assembly including means for contacting a feed aqueous composition with ion exchange resin, the feed aqueous composition and the ion exchange resin moving in a generally co-current direction within the resin cycling contactor assembly;
a regeneration assembly having means for accepting spent resin from the resin cycling contactor assembly, for regenerating the spent resin by removing contaminant ions therefrom, and for transporting regenerated resin to the resin cycling contactor assembly;
said resin cycling contactor assembly including an elongated contactor having an inlet, an outlet and a lengthy flow path of a relatively narrow cross-section;
said resin cycling contactor assembly including at least two recycle resin reservoirs positioned in a generally parallel relationship with respect to each other;
each of said recycle resin reservoirs including means for providing resin to means for combining said resin with a flow of feed aqueous composition into a feed slurry which flows into the inlet of said contactor;
each of said recycle resin reservoirs and said regeneration assembly including means for receiving a slurry of cycled resin and treated aqueous composition from the outlet of said contactor;
said recycle resin reservoirs being in alternating communication with said means for transferring regenerated resin from the regeneration assembly and being in alternating communication with said inlet and outlet of the contactor, said alternating communications being such that neither recycle resin reservoir is in communication with both the regenerated resin transfer means and the contactor outlet at the same time during operation of the apparatus; and
means for transferring out of said apparatus an aqueous composition product which had passed through said resin cycling contactor assembly.

11. The continuous apparatus in accordance with claim 10, wherein each of said recycle resin reservoirs has a cross-sectional area substantially greater than said relatively narrow cross-section of the contactor.

12. The continuous apparatus in accordance with claim 10, wherein said regeneration assembly regenerates the ion exchange resin by countercurrently contacting the resin with treatment liquids.

13. The continuous apparatus in accordance with claim 10, wherein said means of the recycle resin reservoirs for combining resin and aqueous feed further includes introducer means for combining the aqueous composition feed with resin from the recycle resin reservoirs, said introducer means injecting a flow of aqueous composition feed into a flow of ion exchange resin from one of the recycled resin reservoirs and for thus forming the feed slurry by venturi action, the feed slurry having turbulence characteristics.

14. The continuous apparatus in accordance with claim 10, wherein each of said recycle resin reservoirs includes means for separating the slurry of cycled resin and treated aqueous composition into cycled resin and treated aqueous composition flowing to said transferring means.

15. A continuous ion exchange method, comprising the steps of:
contacting a feed aqueous composition with ion exchange resin within a moving bed resin cycling contactor assembly having a contactor with a lengthy flow path of a relatively narrow cross-section;
said contacting step including moving the feed aqueous composition and ion exchange resin in a generally co-current manner through the narrow and lengthy flow path of the contactor;
providing a regeneration assembly and accepting therewithin spent resin from the resin cycling contactor assembly after same has progressed through at least one of said co-current moving steps, and regenerating spent resin within the regeneration assembly by removing contaminant ions therefrom;
transporting regenerated resin from the regeneration assembly to a first recycle resin reservoir of the resin cycling contactor assembly;
combining resin from out of the first recycle resin reservoir with feed aqueous composition into a feed slurry which flows into the contactor to carry out said contacting step;
passing said feed slurry from out of the contactor after said contacting step and into a second recycle resin reservoir of the resin contacting assembly;
separating said slurry, after said passing step, into an aqueous composition product and cycled resin;
combining cycled resin from out of the second recycle resin reservoir with feed aqueous composition to provide further feed slurry which flows into the contactor to further carry out said contacting step; and
passing said further feed slurry from out of the contactor after said further carrying out of the contacting step and separating same into further aqueous composition product and the spent resin for the step of accepting spent resin by the regeneration assembly.

16. The continuous method in accordance with claim 15, wherein said passing step further includes transporting said further feed slurry from out of the contactor to a spent resin reservoir which carries out said step of separating the further feed slurry into aqueous composition product and spent resin.

17. The continuous method in accordance with claim 15, wherein said combining steps include developing venturi action by a procedure including injecting into a common area a flow of the feed aqueous composition and a flow of resin from alternating ones of the first and second recycle resin reservoir in order to thereby provide a continuous feed slurry.

18. The continuous method in accordance with claim 15, wherein said resin of the feed slurry has an average velocity which is less than the average velocity of the feed aqueous composition of the feed slurry.

19. The continuous method in accordance with claim 15, wherein said step of regenerating spent resin within the regeneration assembly includes countercurrent contacting of regenerating fluids and the spent resin.

20. The continuous method in accordance with claim 19, wherein said regenerating step includes injecting regeneration liquid into the spent resin and passing the regeneration liquid in a generally laminar flow and injecting displacement rinse solution in a laminar flow through the spent resin as a compacted resin bed.

* * * * *